United States Patent [19]

Takahashi et al.

[11] Patent Number: 5,373,567
[45] Date of Patent: Dec. 13, 1994

[54] METHOD AND APPARATUS FOR PATTERN MATCHING

[75] Inventors: Kozo Takahashi, Tokyo; Toshiaki Kitamura, Yokohama; Muneki Hamashima, Urayasu, all of Japan

[73] Assignee: Nikon Corporation, Tokyo, Japan

[21] Appl. No.: 2,036

[22] Filed: Jan. 8, 1993

[30] Foreign Application Priority Data

Jan. 13, 1992 [JP] Japan .................. 4-023159

[51] Int. Cl.$^5$ .......................... G06K 9/68; G06K 9/36
[52] U.S. Cl. ............................................. 382/34; 382/56
[58] Field of Search .............. 382/30, 33, 34, 36, 382/38, 42, 47, 48, 56

[56] References Cited

U.S. PATENT DOCUMENTS

| | | | |
|---|---|---|---|
| 3,289,164 | 11/1966 | Rabinow | 382/47 |
| 3,827,025 | 7/1974 | Mauch et al. | 382/47 |
| 3,829,831 | 8/1974 | Yamamoto et al. | 382/38 |
| 4,072,928 | 2/1978 | Wilder | 382/36 |
| 4,742,556 | 5/1988 | Davis, Jr. et al. | 382/30 |
| 4,893,346 | 1/1990 | Bishop | 382/30 |

*Primary Examiner*—Joseph Mancuso
*Assistant Examiner*—David Fox
*Attorney, Agent, or Firm*—Shapiro and Shapiro

[57] ABSTRACT

In the pattern matching method, when a reference pattern is extracted from the reference picture, check search is carried out repeatedly a plural number of times while conducting picture compressions on the reference picture with the compression start position being changed to obtain correlation values between the reference picture and the reference pattern. Based on the correlation values obtained by the check search, the number of times of search to be done actually and the picture compression ratio for the actual search are determined.

19 Claims, 11 Drawing Sheets

FIG. 10A

A PORTION OF PICTURE AS SEARCH OBJECT

| H | H | H | H | H |
|---|---|---|---|---|
| M | M | M | M | M |
| H | H | H | H | H |
| M | M | M | M | M |
| H | H | H | H | H |

FIG. 10B

A PORTION OF PICTURE AS SEARCH OBJECT

| H | M | H | M | H |
|---|---|---|---|---|
| H | M | H | M | H |
| H | M | H | M | H |
| H | M | H | M | H |
| H | M | H | M | H |

METHOD AND APPARATUS FOR PATTERN MATCHING

BACKGROUND OF THE INVENTION

1. Field of the Invention

The present invention relates to a method and apparatus for pattern matching particularly suitable for use in apparatus for measuring the positions of patterns, apparatus for examining patterns or other similar apparatus.

2. Related Background Art

In the art, such pattern matching technique has been known and used in apparatus for examining patterns etc. in which a pattern analogous to a reference pattern previously extracted is detected by subjecting it to a correlation processing by digital picture processing. Such pattern matching technique is hereinafter referred to as "search". In searching for a pattern analogous to the reference pattern, there is often used a multigradation intensity picture processing method such as the normalizing correlation technique. If the entire picture is processed as it is by employing the above-mentioned processing method, it takes a very long processing time. In order to reduce the processing time, among others, the picture compression method is well known in which the correlation processing is conducted with data-compression of the picture signals.

One of the picture compression methods according to the prior art is the method in which a picture composed of $(M \times N)$ pixels is divided into small elements each consisting of $(m \times n)$ pixels and one value is alloted to each one element. The one value is determined from the data of the individual pixels in the element. The method for determining the one value may be any suitable one. For example, the value may be a value representative of the element (the value of a particular pixel or the value of a randomly selected pixel in the element), the maximum or minimum value in the element, or the average value in the element.

In order to assure a stable search, a pre-checking search is sometimes conducted on the original reference picture from which the reference pattern has been extracted. In this search, for example, it is checked whether or not the reference pattern has been prepared correctly and/or whether or not, in the area near the reference pattern, there is any pattern similar to the reference pattern. In this specification, such search for the purpose of checking is hereinafter referred to as "check search".

It is known that the compressed picture as obtained by the above-mentioned picture compression method is somehow different from the original picture. Further, when the picture compression is performed by using the values which represent the individual elements and each representative value is the value of the pixel existing in a determined position within the element, there is produced a problem that by shifting the divided positions of picture compression, the representative values of the respective elements are rendered different from those before shift and, therefore, the compressed picture itself is also rendered different from that before shift. Consequently, in the case where each element is composed of $(m \times n)$ pixels, there may be formed $(m \times n)$ different compressed pictures because the number of the representative points for picture compression is $(m \times n)$. This means that the search conducted on the picture actually to be searched (this picture is hereinafter referred to as "the picture as search object") involves the possibility of error. The reason for this is that if the divided positions of picture compression of the reference picture which is similar to the picture as search object and from which the reference pattern has been extracted, are different from the divided positions of picture compression of the picture as search object, the correlation processing will be performed between the different pictures which makes the correlation value unstable. Therefore, there is the possibility that search error or false discrimination may be caused by the unstable correlation values according to the kind of the pattern, the variation of the conditions of the image-forming optical system and the like. This is an important disadvantage of the prior art.

SUMMARY OF THE INVENTION

Accordingly, an object of the present invention is to provide a method and apparatus for pattern matching which enables reducing the possibility of false discrimination by picture compression and makes it possible to perform the search always in stable manner.

To attain this object of the present, according to one aspect of the invention, there is provided a pattern matching method for detecting a pattern analogous to the reference pattern in the picture as search object obtained by image-pickup of the test sample having patterns formed thereon, said method comprising the steps of:

inputting a reference picture by image-pickup of a reference sample having patterns formed thereon analogous to the test sample;

dividing said reference picture into elements having the same size and picture-compressing said reference picture by obtaining picture data representative of the individual elements based on the picture data of the individual pixels in the individual elements;

extracting a desired pattern as the reference pattern from said compressed reference picture;

repeating above-said image compression of the reference picture a plural number of times while shifting the divided positions and then computing the correlation values of the individual reference pictures obtained by said plural times of image compression relative to said reference pattern;

estimating, from the correlation values thus obtained, the dependence of variation of the correlation values between said picture as search object and said reference pattern in two directions orthogonal to each other in a two-dimensional plane;

determining, from the directional dependence of variation of the correlation values thus obtained, a plural number of sets of the divided positions of picture compression for said picture as search object;

inputting said picture as search object by image-pickup of the test sample;

dividing said picture as search object into elements having the same size as that of said reference picture and obtaining, picture data representative of the individual elements based on the picture data of the individual pixels in the individual elements, thereby picture-compressing said picture as search object at the determined divided positions, and repeating such picture compression a plural number of times for every set of the determined divided positions; and computing the correlation values of the individual compressed as search object relative to said reference pattern.

In carrying out the pattern matching method of the present invention, the following steps (1) to (4) may optionally be added as pre-processing or after-processing:

(1) conducting an offset adjustment on both of said reference picture and the picture as search object using a picture in which no pattern is present;

(2) conducting an edge-enhancing processing on both of said reference picture and the picture as search object;

(3) blocking the individual pixels into elements when the picture compression is performed for reference picture and when the picture compression is performed on the picture as search object, conducting a data conversion on the picture data of the individual pixels in the individual elements employing the same statistical technique and obtaining the picture data representative of said individual elements on the basis of the data-converted picture data; and (4) moving a desired pattern extracted as the reference pattern into other several points on the image plane, computing the correlation values between the individual reference pictures for correction and the reference patterns thus obtained, making, from the correlation values for correction thus obtained, a correction table for the correlation values corresponding to their positions on the image plane, and correcting the correlation values between said picture as search object and said reference picture based on the correction table.

According to another aspect of the invention, there is provided a pattern matching apparatus for detecting a pattern analogous to the reference pattern in the picture as search object obtained by image-pickup of the test sample having patterns formed thereon, for example, as shown in FIGS. 1 and 2, said pattern matching apparatus comprising:

picture inputting means for inputting a reference picture by image-pickup of a reference sample having patterns formed thereon analogous to the test sample and for inputting the picture as search object by image-pickup of the test sample;

reference picture compression means for dividing said reference picture into elements having a predetermined size and picture-compressing said reference picture by obtaining picture data representative of the individual elements based on the picture data of the individual pixels in the individual elements;

extraction means for extracting a desired pattern as the reference pattern from said compressed reference picture;

first correlation value computing means for repeating above-said image compression of the reference picture a plural number of times while shifting the divided positions and computing the correlation values of the individual reference pictures obtained by said plural times of image compression relative to said reference pattern;

estimation means for estimating, from the correlation values thus obtained, the dependence of variation of the correlation values between said picture as search object and said reference pattern in two directions orthogonal to each other in a two-dimensional plane;

determination means for determining, from the directional dependence of variation of the correlation values thus obtained, a plural number of sets of the divided positions of picture compression for said picture as search object;

picture as search object compression means for dividing said picture as search object into elements having the same size as that of said reference picture and obtaining picture data representative of the individual elements based on the picture data of the individual pixels in the individual elements, thereby picture-compressing said picture as search object at the determined divided positions, and repeating such picture compression a plural number of times for every set of the determined divided positions; and second correlation value computing means for computing the correlation values of the individual compressed pictures as search object relative to said reference pattern.

In the apparatus according to the invention, after the extraction of the reference pattern from the compressed reference picture, the picture compression of the reference picture is conducted a plural number of times while shifting the divided positions and then the correlation values of the individual compressed reference pictures relative to the reference pattern are computed. Thus, a plural number of check searches are conducted while shifting the divided positions of picture compression. As a matter of course, the maximum correlation value is obtained when the divided positions of picture compression of the reference picture are coincident with the divided positions of picture compression of the reference pattern. When each element is composed of $(m \times n)$ pixels wherein m is the number of pixels in X-direction and n is the number of pixels in Y-direction and the picture data of the pixels in the element is represented by a certain picture data alloted to the element after picture compression, there may exist $(m \times n)$ sets of the divided positions of picture compression. For the purpose of explanation, the reference picture is compressed at the divided positions shifted by i pixels in X-direction and j pixels in Y-direction from the divided positions at which the reference pattern has been extracted. And a check search is conducted to obtain the correlation value between said reference picture and the reference pattern. Such check search is referred to as (i, j) check search for the sake of explanation.

When both of m and n are even numbers, examples of check search include (m/2, n/2) check search, (m/2, 0) check search, (0, n/2) check search etc. If all of the correlation values obtained by (i, j) check search are lower than a determined level, then the size of the element is reduced in order to increase the compression ratio of data for the compression of the reference picture. For example, the picture compression is so carried out that one element represents the picture data of $(m/2 \times n/2)$ pixels. Also, if only the correlation values obtained by (m/2, 0) check search are lower than the determined level, two searches are conducted on the picture as search object, which are, for example, (0, 0) search and (m/2, 0) search. Herein, the term of (0, 0) search means the search in which the first picture compression is conducted on the picture as search object at certain divided positions of picture compression and the correlation values of said picture as search object relative to the reference pattern are computed. When the picture as search object is compressed at the divided positions shifted by i pixels in X-direction and j pixels in Y-direction from the divided positions at which the first picture compression has been done, and a search is conducted to obtain the correction value between said picture as search object and the reference pattern, such search is referred to as (i, j) search for the sake of explanation.

The method and apparatus according to the present invention has many advantages.

Since the picture compression of the picture as search object is repeated several times while shifting the divided positions and the correlation values between the individual pictures as search object obtained by the picture compressions and the picture-compressed reference pattern are obtained, the possibility of false discrimination is reduced. Further, in a preferred embodiment of the invention where the picture compression of the reference picture is repeated plural times while shifting the divided positions and the correlation values between the individual reference pictures obtained by the picture compressions and the reference pattern are obtained, the possibility of false discrimination can be reduced, without losing the effect of time saving derived from the picture compression, by determining, from the correlation values thus obtained, a plural number of sets of, as needed, the divided positions of picture compression for the picture as search object.

Among the optional processings (1) to (4) mentioned above, the processing (1) has the advantage that the positional differences can be corrected, for example, by subtracting from the picture as search object the picture of the image plane where no pattern is present. The processing (2) has the advantage that any long cycle variation such as illumination variation can be eliminated. The processing (3) has the advantage that the deterioration of the correlation values which may occur in the case of such picture having poor S/N ratio or such picture as search object having noises can be reduced by a statistical processing technique such as averaging processing, median filter processing or central value extraction processing.

In the embodiment comprising additionally the processing (4), the pattern extracted as reference pattern is moved into a plural number of points in the image plane and the check search is conducted on the reference pictures for correction obtained by the pattern shifting. The distribution of the correlation values resulting from it is stored in memory as a correction table. By using the correction table, it is possible to always correctly specify the pattern analogous to the reference pattern wherever the pattern may exist in the picture as search object. All of the pattern matching methods as mentioned above can be carried out with the pattern matching apparatus according to the invention.

BRIEF DESCRIPTION OF THE DRAWINGS

FIG. 10A is a schematic illustration showing the distribution of results as obtained by superposing the correlation values resulting from two searches with the divided positions of the picture compression being shifted by m/2 pixels in X-direction every time;

FIG. 10B is a schematic illustration showing the distribution of results as obtained by superposing the correlation values resulting from two searches with the divided positions of the picture compression being shifted by n/2 pixels in Y-direction every time;

DETAILED DESCRIPTION OF THE PREFERRED EMBODIMENTS

Hereinafter, the present invention will be described in detail with reference to a preferred embodiment shown in the accompanying drawings. In the present invention, the embodiment has been applied to the picture positioning mechanism of an automatic optical measuring apparatus.

Figure 1:
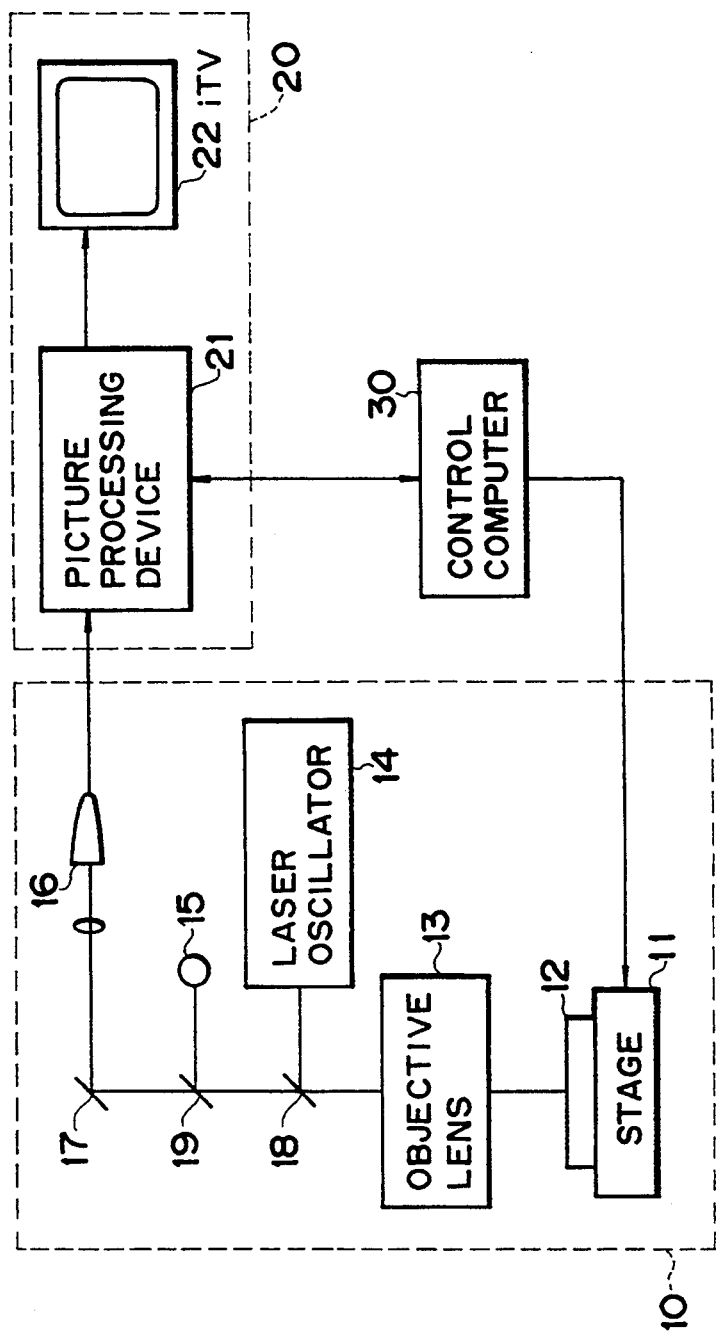
FIG. 1 is a block diagram showing the entire construction of the automatic optical measuring apparatus according to an embodiment of the present invention.

Referring first to FIG. 1, there is schematically shown an optical measuring apparatus as an embodiment of the present invention. The measuring unit of the apparatus is designated by 10 as a whole. The reference numeral 11 denotes a stage on which a sample 12 is placed. The sample 12 is illuminated by an illumination system not shown in the drawing. The light reflected from the sample 12 is guided to an image sensor 16 through an objective lens 13 and a mirror 17. Thus, the image sensor 16 picks up an image of a portion to be observed of the sample 12. The area of the portion to be observed is defined by the TTL optical system of the objective lens 13.

Designated by 14 is a laser oscillator for generating a laser beam which serves as the probe for measurement. The laser beam from the laser oscillator 14 is focused on the sample 11 through a half-mirror 18 and the objective lens 13. The reflected beam from the sample 13 is guided to a laser receiver 15 through the objective lens 13 and half-mirrors 18 and 19. The laser beam can be used, for example, to indicate a pattern as the object to be measured.

The reference numeral 20 denotes a picture processing unit which includes a picture processing device 21 and an iTV receiver 22. The picked-up picture signal obtained by the image sensor 16 in the measuring unit 10 is introduced into the picture processing device 21. The picture processing device processes the signal into a video signal which is then supplied to the iTV receiver 22 and displayed on it. To control all the parts and devices in the apparatus, a control computer 30 is connected to them through respective signal lines. Thus, the operation of the apparatus is controlled as a whole by the control computer 30.

Figure 2:
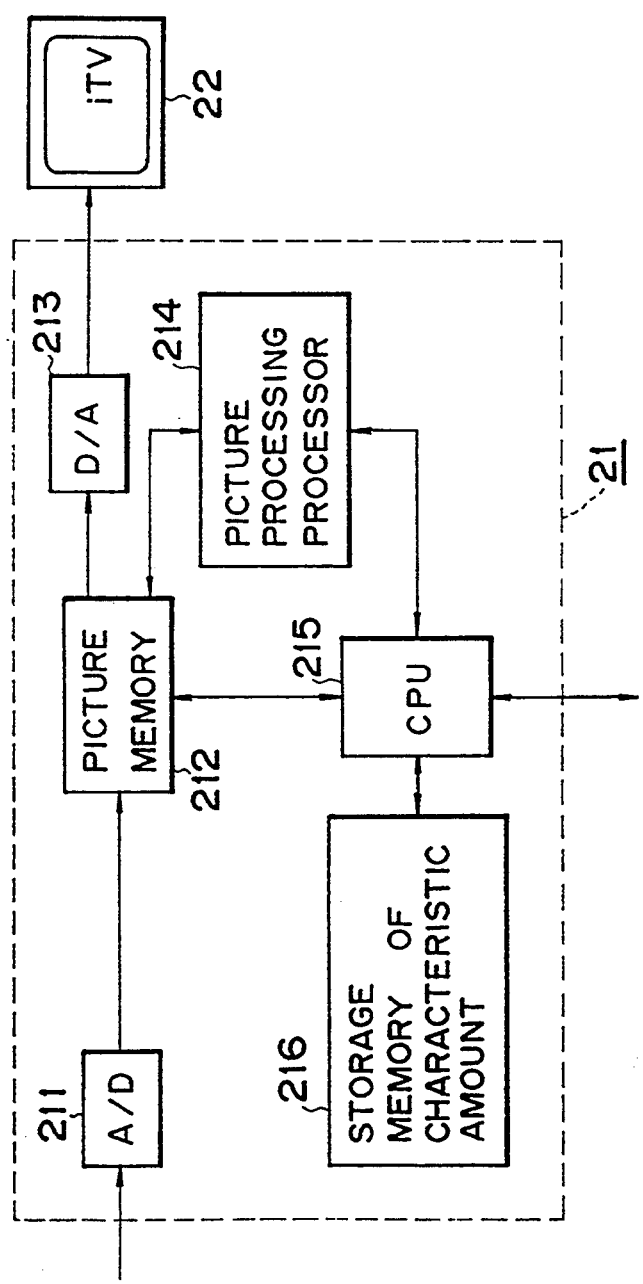
FIG. 2 is a block diagram showing the detailed construction of the picture processing device 21 shown in FIG. 1.

FIG. 2 shows, in detail, the construction of the picture processing unit 21 shown in FIG. 1. In FIG. 2, the above-mentioned signal of picked-up image from the image sensor 16 is converted into digital picture data by an analog/digital (A/D) converter 211. The picture data from the A/D converter are sequentially written in a picture memory 212. The picture data stored in the memory are supplied to the iTV receiver 22 as analog video signals by a digital/analog (D/A) converter 213. The picture data in the picture memory 214 can be processed in a predetermined manner by a proper picture processing processor 214. The operations of the respective parts of the picture processing unit 21 are controlled by a central processing unit 215 (hereinafter referred to briefly as CPU). Designated by 216 is a storage memory of characteristic amount which is able to store the kind of the later-described pretreatment or after-treatment in correspondence to the characteristic amount of the picture as search object. The CPU can transmit and receive signals to and from the control computer 30 shown in FIG. 1.

The basic operations of the picture processing unit of the present invention will be described with reference to FIGS. 3 to 17.

Figure 4:
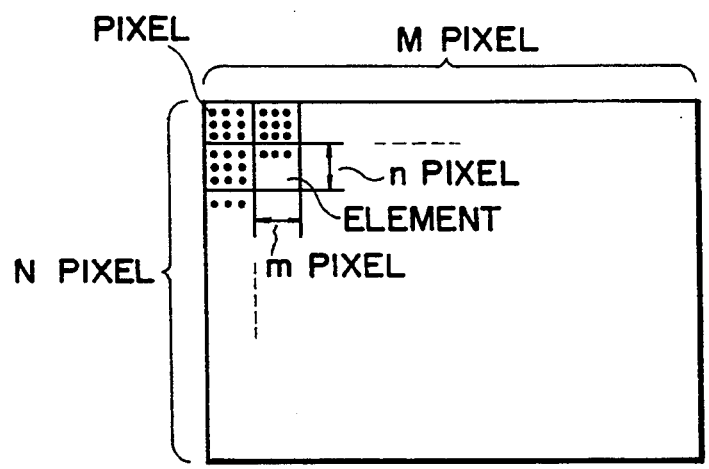
FIG. 4 is a diagram illustrating an example of the technique for picture compression.

In the present embodiment, as shown in FIG. 4, the picture represented by the digital data is composed of (M×N) pixels where M is the number of pixels in X-direction and N is the number of pixels in Y-direction. This picture is compressed into elements each of which represents a picture portion comprising (m×n) pixels. A reference picture has been obtained by picking up an image of a reference sample. A portion of the reference picture has been extracted and registered as a reference pattern. Within a picture as search object, a pattern similar to the reference pattern is searched for by correlation processing. The picture as search object means a picture as obtained by picking up an image of a sample having patterns formed thereon. For the sake of simplification, a description will be given of a sheet (a frame) of digital original picture only.

Figure 5:
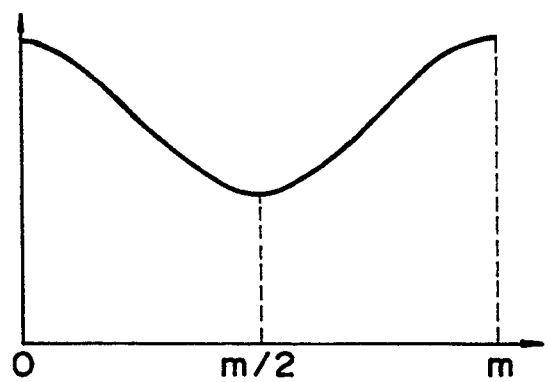
FIG. 5 is a distribution curve showing the distribution of the correlation values as obtained when the divided positions of the picture compression of a picture as search object are shifted in the direction of X-axis.

When the correlation processing is carried out by compressing the picture while shifting the divided positions of the picture compression by 1 (one) pixel every time relative to the divided positions of picture compression for (0, 0) check search, the correlation value of a particular element is a function of the divided positions of picture compression as shown in FIG. 5.

Thus, the correlation value between the compressed reference picture and the reference pattern is the maximum at the same divided positions as those at which the reference pattern has been extracted. The correlation value is smaller with increasing distance from those divided positions. At the farthermost m/2-th pixel, the correlation value is the minimum and the compressed picture is the most different from the original. As the divided positions of picture compression are further shifted, which is equivalent to approaching the 0(zero)-th pixel from the minus direction side, the correlation value becomes again higher and the correlation value reaches the maximum at the m-th pixel which is the same as that at the 0-th pixel.

Figure 6:
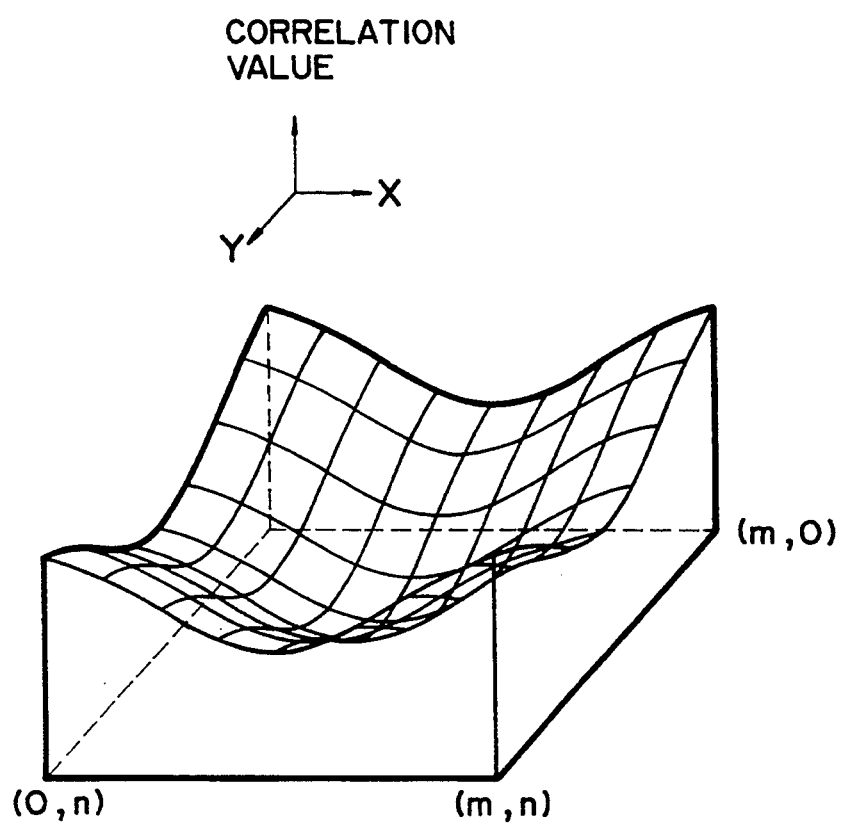
FIG. 6 is a distribution curve showing the distribution of the correlation values as obtained when the divided positions of the picture compression of a picture as search object are shifted in the directions of X-axis and Y-axis.
Figure 7A:
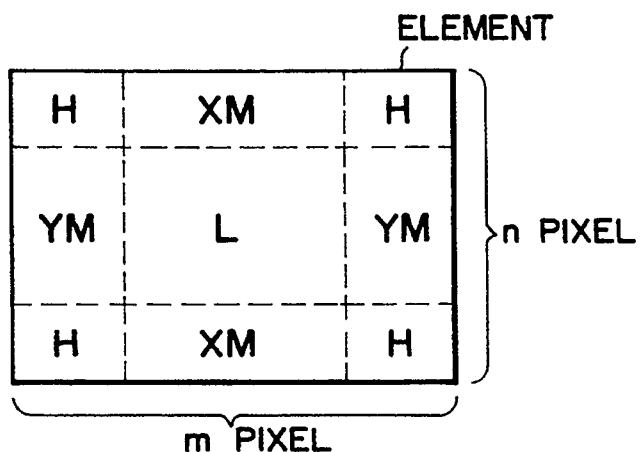
FIG. 7A is a schematic illustration corresponding to the plan view of FIG. 6 showing the distribution of the correlation values as obtained when the divided positions of the picture compression are shifted.

The same is applicable to the correlation value profile in Y-direction. FIG. 6 shows the distribution of correlation values of a certain element as obtained when the divided positions of picture compression are shifted in a plane comprising (m×n) pixels. FIG. 7A shows the distribution of the divided positions more schematically.

Figure 7B:
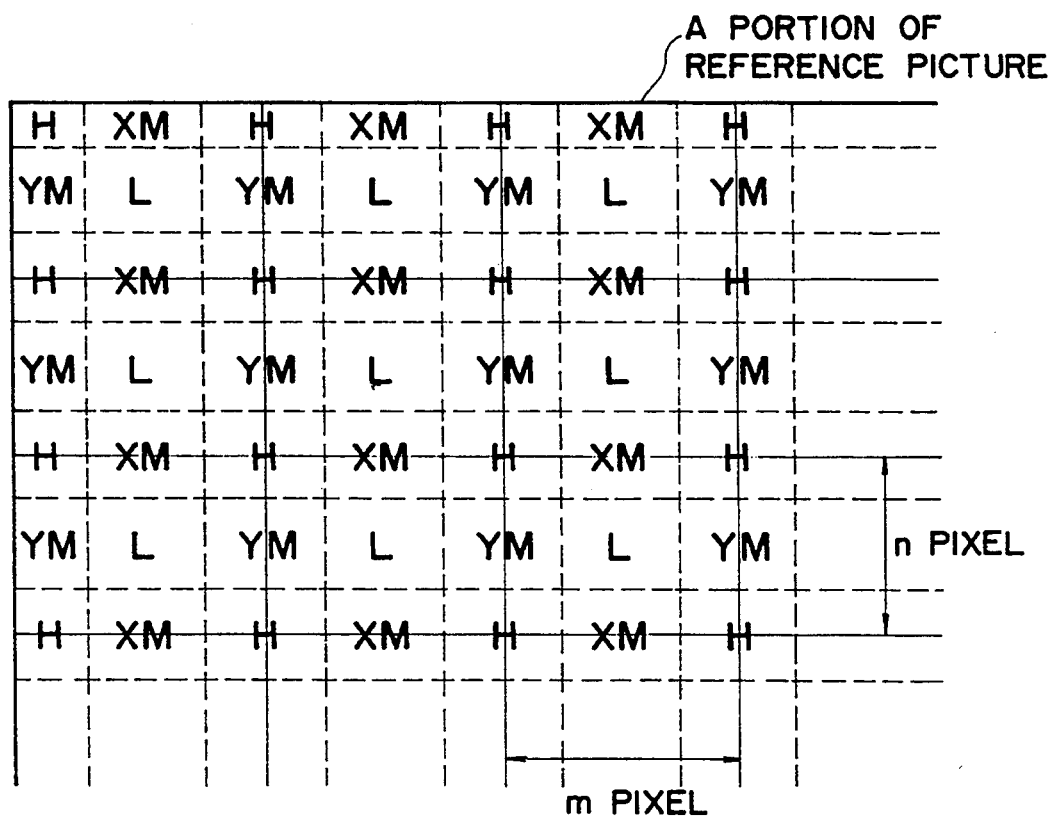
FIG. 7B is a schematic illustration of the distribution of the correlation values in the area including the portion shown in FIG. 7A and its surrounding portions.

In FIG. 7A, the areas designated by H are areas where the correlation value is high. Areas XM are areas where the correlation value decreases depending on the pattern in X-direction. Areas YM are those areas where correlation value decreases depending on the pattern in Y-direction. Area L is the area where the correlation value falls down to the lowest due to the effects of patterns in both of X-direction and Y-direction. FIG. 7B shows the distribution of the correlation values in a far broader area including the element shown in FIG. 7A and its neighboring elements where the divided positions of picture compression are farther shifted. From FIG. 7B, it is seen that the same correlation values appear repeatedly at the cycle of m pixels in X-direction and at the cycle of n pixels in Y-direction.

The repeating correlation processings with increasing shift of the divided positions of picture compression are carried out in the following manner.

Figures 8, 9:
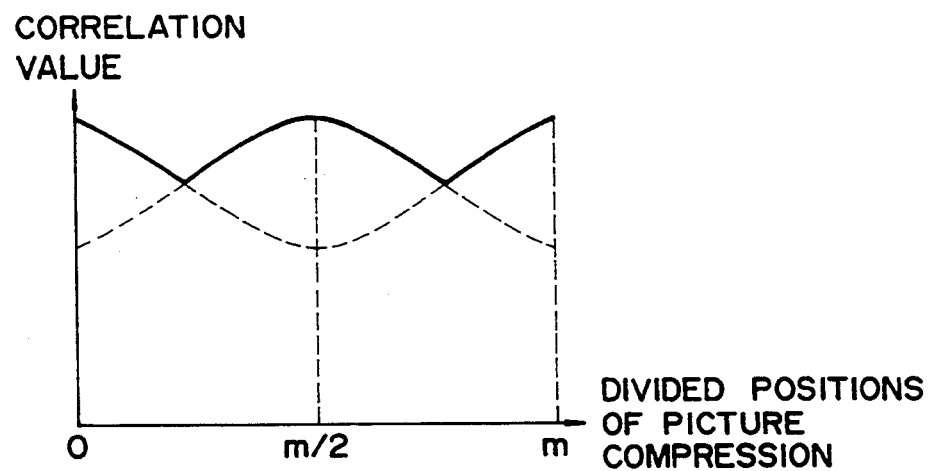
FIG. 8 is a graphical representation of the results as obtained by superposing the correlation values resulting from two searches where the search has been performed with the divided positions of the picture compression being shifted by m/2 pixels in X-direction every time.
FIG. 9 is a schematic illustration showing the distribution of results as obtained by superposing the correlation values resulting from two searches with the divided positions of the picture compression being shifted by m/2 pixels in X-direction and n/2 pixels in Y-direction every time.

When a search is actually carried out, it is unknown at which positions the picture as search object has been divided and the picture compression has been conducted. Therefore, there are produced some variations in correlation values of the picture as search object and the reference pattern. FIG. 8 is a graph as obtained when the correlation values resulting from the first search and the correlation values resulting from the second search are superposed. In this case, the first search was carried out at the position of (0, 0). The second search was done at the position of (m/2, 0), that is, the divided positions of picture compression for the second search were shifted from that for the first search by m/2 pixels in the X-direction. It will be understood that the possible variation in correlation value may be minimized by selecting the maximum value among the correlation values obtained by two searches. The same is applicable to the variation in correlation values in Y-direction. When two searches have to be carried out, it is most advisable in view of searching efficiency that for the second search the divided positions of picture compression should be shifted by m/2 pixels in X-direction and n/2 pixels in Y-direction [(m/2, n/2) search] relative to the first search [(0, 0) search].

FIG. 9 illustrates the distribution of correlation values as obtained by the superposition of the correlation values resulting from the above two searches, that is, (0, 0) search and (m/2, n/2) search. This distribution pattern is the same as that obtainable by shifting the pattern of FIG. 7B diagonally and then superposing it on the other. As readily understood, the low correlation value area L in the FIG. 7B may be eliminated by selecting the higher one of the two correlation values resulting from two searches.

Similarly, when the correlation values resulting from the first (0, 0) search and the correlation values resulting from the second (m/2, 0) search (shifted by m/2 in X-direction) are superposed, there is obtained a pattern as shown in FIG. 10A. Also, when the correlation values resulting from the first (0, 0) search and the correlation values resulting from the second (0, n/2) search (shifted by n/2 in Y-direction) are superposed, there is obtained a pattern as shown in FIG. 10B.

Similarly, if four searches, that is, (0, 0) search, (m/2, n/2) search, (m/2, 0) search and (0, n/2) search are performed and the correlation values resulting from the four researches are superposed, then all of the areas may appear as the high correlation value areas H. By doing so, the possibility of discrimination error may be reduced to a great extent. It is also possible to substantially minimize the variation in correlation value by increasing the number of searches while changing the divided positions of picture compression more minutely. As another modification, the average value may be used instead of the maximum value among the correlation values resulting from a plural number of searches.

Hereinafter, a description will be given of the procedure of check search.

After a reference pattern has been extracted, the picture processing unit 21 can automatically determine several sets of divided positions of picture compression for the picture as search object by plural times of check search in the following manner. To this end, one conducts the picture compression of the reference picture a plural number of times while shifting the divided positions of the picture compression stepwisely. The check search is conducted on the respective reference pictures obtained by the picture compressions to estimate the width of variation in correlation value and the dependence on the variation of the correlation values with respect to the picture as search object and the reference pattern, in X-direction and Y-direction.

Figure 11:
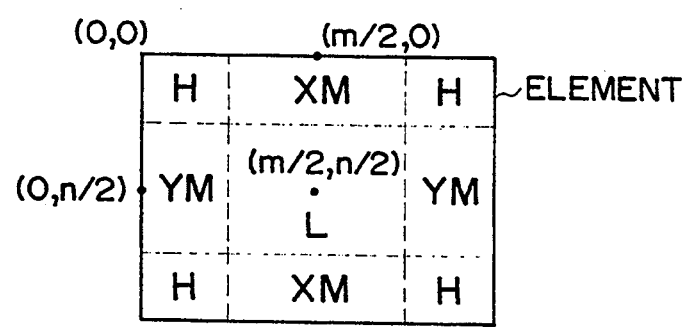
FIG. 11 is a schematic illustration of the divided positions of the picture compression for a check search where the search is performed four times.

As an example, four check searches are performed on the area comprising (m×n) pixels as shown in FIG. 11. The four check searches are (0, 0) check search, (m/2, 0) check search, (0, n/2) check search and (m/2, n/2) check search. By the (m/2, n/2) check search, it is possible to estimate the lowest value of the possible variation. From the result of the (m/2, 0) check search, it is possible to estimate the dependence on the variation in X-direction. Also, the (0, n/2) check search makes it possible to estimate the dependence in Y-direction.

Figure 12:
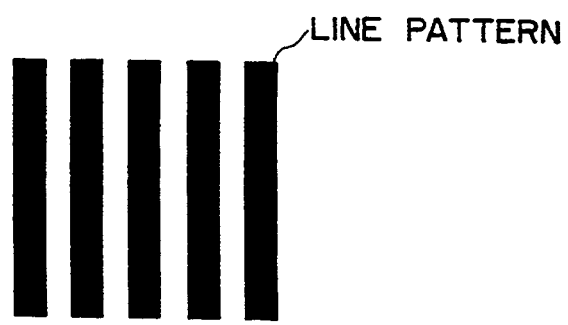
FIG. 12 is a diagram of a vertical line-and-space picture.
Figure 13:
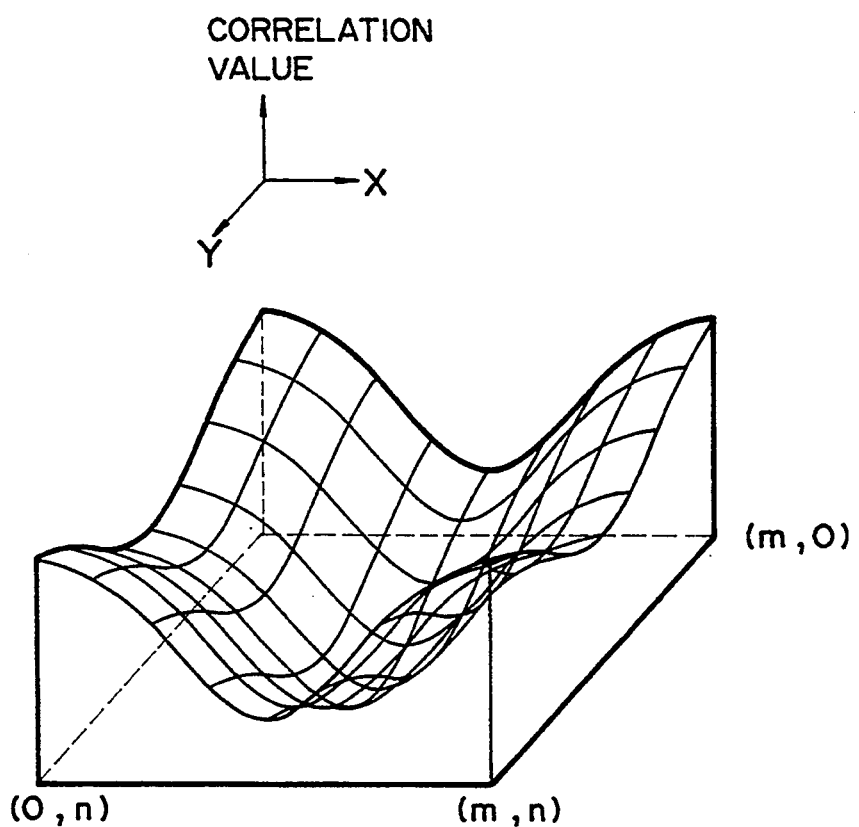
FIG. 13 is a perspective view of the distribution of the self-correlation values of the vertical line-and-space picture.

As an example of the picture, FIG. 12 shows a vertical line-and-space picture in which white lines are arranged at a pitch of m pixels in X-direction. This pattern is a typical example of such picture where the change of the compressed picture is large when the divided positions of picture compression are shifted in X-direction but the change is small when shifted in Y-direction. FIG. 13 illustrates the distribution of the self-correlation values of the vertical line-and-space picture shown in FIG. 12. For such picture, the correlation value resulting from the (m/2, 0) check search is small and the correlation value resulting from the (0, n/2) check search is large because the pattern dependence in Y-direction is high in this case. In ordinary correlation processing, it is theoretically expected that the (0, 0) check search must give the maximum correlation value. However, if another processing such as normalized correlation processing is used, there is the possibility that the (0, 0) check search does not always give the maximum value. In this case, it may be required to perform (0, 0) check search in order to obtain the reference value as upper limit.

From these values, it is possible to determine the divided positions of picture compression for any actual picture as search object. Also, if the results of the check searches indicate the variation being too large, one can determine an optimum compression ratio by repeating the above processing while changing the compression ratio variously. If necessary, in addition to the above processing, any of the following processings may be performed as pre-processing or after-processing.

Firstly, a description will be given of the method for decreasing the variation of correlation values caused by positional variations in an image plane such as variation in illumination of light source and/or shading of the image sensor 16 (variation in sensitiveness).

Figure 14A:
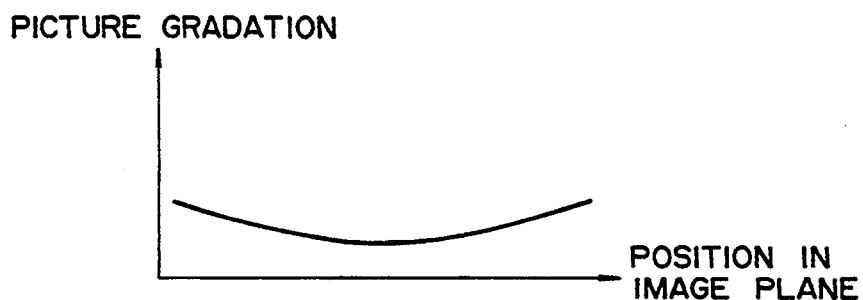
FIG. 14A is a graph showing the line profile of the picture data as obtained when no pattern is present.
Figure 14B:
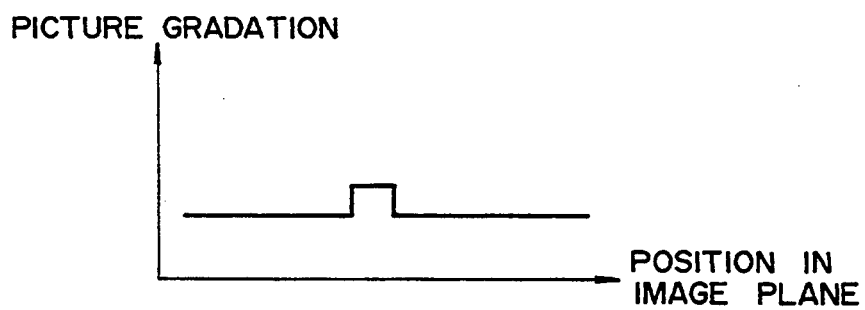
FIG. 14B is a graph showing the line edge of the picture data as obtained when there is no positional difference.
Figure 14C:
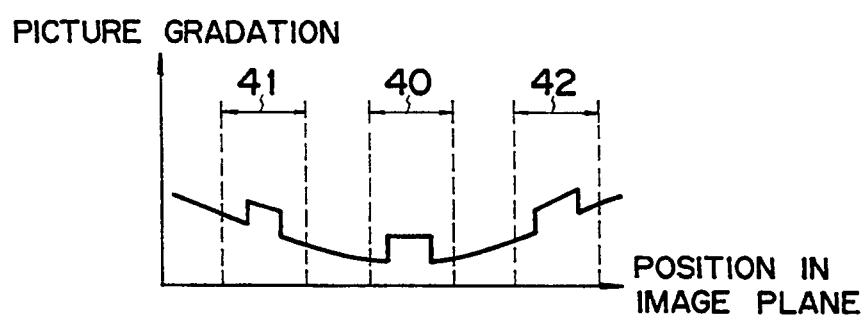
FIG. 14C is a graph showing the line edge of the picture data as obtained when there is some positional difference.

In general, shading, that is, the variation in sensitiveness of the image receiving plane of the image sensor 16, variation in illumination and other similar variation may cause some positional differences in an image plane. FIGS. 14A to 14D show unidimensional line profiles along a certain scanning line in an image plane. FIG. 14A shows the positional difference of picture data in an image plane for the case where no pattern is present. FIG. 14B shows a pattern for the case where the picture data have no positional difference within an image plane. FIG. 14C shows a picture as obtained by the superposition of two pictures of FIGS. 14A and 14B. In other words, the picture shown in FIG. 14C is such a picture in which the same pattern by nature may be observed as different data depending on the position in an image plane. In the case shown in FIG. 14C, if the reference pattern is formed, for example, at the position of 40, and the patterns existing at the positions, 41 and 42 are searched for by correlation processing, there is produced the phenomenon that the correlation values decrease at the positions of 41 and 42 respectively.

To prevent the decrease of correlation value, the following methods (1) to (4) are useful:

(1) Correction by using the picture containing no pattern as a correction table.

To carry out this method, one previously stores the picture containing no pattern as shown in FIG. 14A as a correction table. In the actual search, a correction, as pre-processing, is made by subtracting the picture data of the correction table from the image plane shown in FIG. 14C or by multiplying the picture data of the respective pixels by a determined percentage of the correction table thereby reducing the positional difference in the image plane.

Figure 14D:
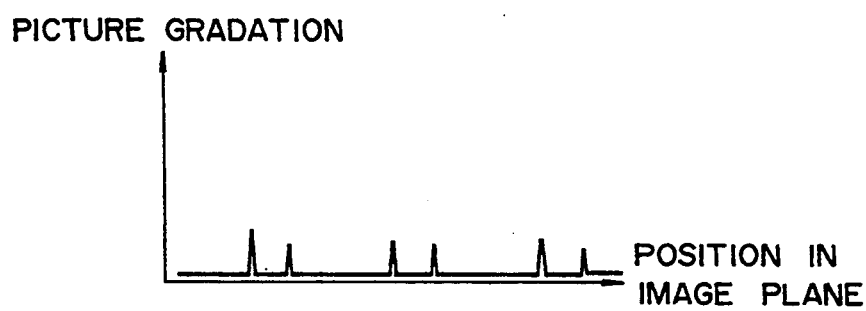
FIG. 14D is a graph showing the line edge of the picture data as obtained after a picture has been subjected to a profile-shaping processing.

(2) Removal of gentle gradation change by filtering the reference picture and the picture as search object for edge extraction processing and thereafter performing the correlation processing. For example, by subjecting a picture as shown in FIG. 14C to the edge extraction processing, there is obtained a picture as shown in FIG. 14D and, therefore, the component of gentle gradation change can be decreased.

(3) Data conversion by using a statistical technique (for example, average processing, median filter processing, middle value processing etc.).

In this method, when the reference picture and the picture as search object are picture-compressed, the picture signals of the respective pixels in the element are data-converted by the same statistical technique thereby reducing the deterioration of the correlation values in a picture having unfavourable S/N ratio or in a picture containing noise.

(4) Correction of the correlation values by using a particularly prepared correction table. The table is prepared in the following manner:

As a portion check search processing, one moves the pattern extracted as the reference pattern to several points within the image plane and conducts a search. By the search, one measures the distribution of correlation values relative to positions within the picture plane and the distribution is used as the table for correcting the correlation value.

In this method, the correlation processing is performed after the pattern as search object has been moved to several points within the image plane. The correction values to be used in the actual search are obtained from the distribution of correlation values in the respective areas of the image plane. The correction value changes depending on the position in the image plane. In other words, this method is a normalization method in which a correlation value is previously determined by correlation computing for every position to be searched and in actual search there is a subtraction of the determined correlation value from the correlation value after the search for every position within the image plane.

By additionally performing any suitable one of the above correction methods according to the case, the variation of the correlation values by the picture compression correlation processing can be minimized and a stable detection can be realized.

The manner of operation of the apparatus according to the present embodiment will be described hereinafter specifically in connection with the operation of searching the picture as search object for a pattern analogous to the reference pattern.

Referring to FIG. 1, there is shown the sample 12 placed on the stage 11 of the apparatus. At first, the operator conducts alignment of the pattern to be measured using the screen of the iTV receiver 22. For this alignment, the operator adjusts the TTL optical system of the objective lens 13 to the position in which the laser spot acting as a probe is in alignment with the center of the screen of iTV receiver 22. The laser spot is formed by focusing the laser beam emitted from the laser oscillator 14 on the sample 12 as a probe. The picture data of the observed image plane of the sample 12 are stored in the picture memory 212 in FIG. 2 and a portion of the picture is registered as the reference pattern. Then, the correlation processing is carried out by repeating the check search four times while shifting the divided positions of picture compression as given below. Thereafter, the operator determines the divided positions of picture compression for the picture as search object (hereinafter, this is referred to as "search condition"). For the purpose of explanation, in this embodiment, all of the pixels are compressed in the manner of $\frac{1}{8}$ compression where every element represents $8 \times 8$ pixels. The four check searches mentioned above are as follows:

(0, 0) check search: Search for the reference picture picture-compressed at the same divided positions as those at which the reference pattern has previously been extracted. The positions are referred to as the base positions.

(4, 0) check search: Search for the reference picture picture-compressed at divided positions shifted by 4 pixels from the base positions in X-direction.

(0, 4) check search: Search for the reference picture picture-compressed at divided positions shifted by 4 pixels from the base positions in Y-direction.

(4, 4) check search: Search for the reference picture picture-compressed at divided positions shifted by 4 pixels in X-direction and 4 pixels in Y-direction from the base positions.

The correlation value is the highest for (0, 0) check search and the lowest for (4, 4) check search. The correlation values of (0, 4) and (4, 0) check searches are in the middle.

The search condition mentioned above can be determined by various methods of which three methods will be described in detail.

The First Method for Determining the Search Condition

Figure 3:
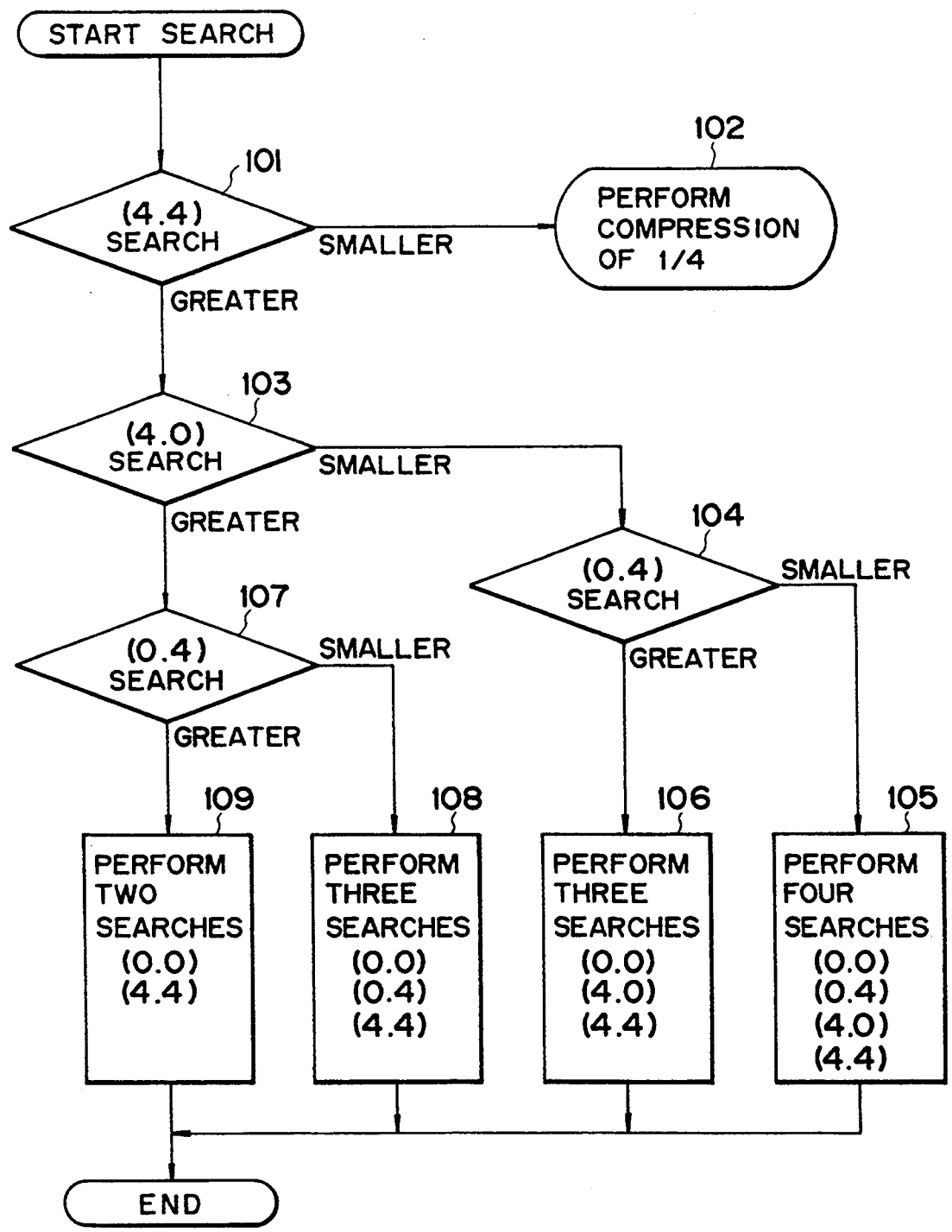
FIG. 3 is a flow chart illustrating an example of the check search in the embodiment.

A limit value is predetermined for each of the correlation values obtained by the respective check searches and then the processings shown in FIG. 3 are performed.

Referring to the flow chart of FIG. 3, at first (4, 4) check search is performed. When the correlation value obtained at this step is smaller than the limit value, $\frac{1}{8}$ compression is judged to be unsuitable and the processing is turned to $\frac{1}{4}$ compression at step 102 where (2, 2) check search is similarly performed. When the correlation value at step 101 is greater than the limit value, the operation proceeds to step 103 where (4, 0) check search is performed. When the correlation value obtained at this step is smaller than the limit value, the process turns to step 104 where (0, 4) check search is performed. When the correlation value is smaller than the limit value also at this step 104, the operation proceeds to step 105. At this step, four searches, namely (0, 0) search, (0, 4) search, (4, 0) search and (4, 4) search are performed for the picture as search object. When the correlation value at step 104 is greater than the limit value, the operation proceeds to step 106. At this step, three searches, namely (0, 0) search, (4, 0) search and (4, 4) search are performed.

When the correlation value at step 103 is greater than the limit value, the operation proceeds to step 107 where (0, 4) check search is performed. When the correlation value obtained at this step is smaller than the limit value, the operation proceeds to step 108. At this step three searches are performed, namely (0,0) search, (0,4) search and (4,4) search are performed. When the correlation value at step 107 is greater than the limit value, the process proceeds to step 109. At this step, two searches, namely (0, 0) search and (4, 4) search are performed for the picture as search object.

The flow of the process shown in FIG. 3 may be summarized as follows:

When the correlation value obtained by (4, 0) check search is smaller than the limit value, which indicates high dependence of the pattern in X-direction, (4, 0) search is actually performed for the picture as search object compressed at the divided positions shifted by 4 pixels in X-direction.

When the correlation value obtained by (0, 4) check search is smaller than the limit value, which indicates high dependence of the pattern in Y-direction, (0, 4)

search is actually performed for the picture as search object compressed at the divided positions shifted by 4 pixels in Y-direction.

When the correlation value obtained by (0, 4) or (4, 0) check search is greater than the limit value, only two searches, namely (0, 0) and (4, 4) searches are actually performed for the picture as search object.

The Second Method for Determining the Search Condition

Two limit values (lower and higher) are predetermined for each check search. Using the two limit values one determines the search condition. To demonstrate this method concretely, an example is given under the following assumptions:

Regarding the correlation value of (4, 4) check search: correlation value is S44, higher limit is TH44 and lower limit is TL44.

Regarding the correlation value of (4, 0) check search: correlation value is S40, higher limit is TH40 and lower limit is TL40.

Regarding the correlation value of (0, 4) check search: correlation value is S04, higher limit is TH04 and lower limit is TL04.

Cases are classified into the following (a), (b) and (c) for which the search condition for the picture as search object is determined.

|  | Determination |
|---|---|
| (a) | |
| Result of (4, 4) check search | |
| S44 > TH44 → | (4, 4) search is unnecessary in actual search |
| TH44 ≧ S44 ≧ TL44 → | (4, 4) search is necessary in actual search |
| S44 < TL44 → | Turn to ¼ compression processing |
| (b) | |
| Result of (4, 0) check search | |
| S40 > TH40 → | (4, 0) search is unnecessary in actual search |
| TH40 ≧ S40 ≧ TL40 → | (4, 0) search is necessary in actual search |
| S40 < TL40 → | Turn to ¼ compression processing |
| (c) | |
| Result of (0, 4) check search | |
| S04 > TH04 → | (0, 4) search is unnecessary in actual search |
| TH04 ≧ S04 ≧ TL04 → | (0, 4) search is necessary in actual search |
| S04 < TL04 → | Turn to ¼ compression processing |

The Third Method for Determining the Search Condition

The second method is modified in the following manner:

When S40 < TL40:

The reference picture is reformed by shifting the divided positions of picture compression in X-direction and performing the same processing to find out such reference picture in which S40 < TL40. As the result, the optimization of the reference picture is attained.

When the condition of S40 ≧ TL40 is not satisfied:

The process is turned to ¼ compression processing.

When S40 > TH04:

The reference picture is reformed by shifting the divided positions of picture compression in Y-direction and then performing the same processing.

As previously described, the positional difference within an image plane can be corrected by the methods (1)–(4). Examples of the correction by these methods are given below.

Example of the Correction by Method (1)

During the initial operating time of the apparatus, one extracts the image plane in the state in which no pattern is present and uses this picture as an image plane correction table. Prior to the correlation procesing, one conducts a pre-processing in which the amount of the correction table is subtracted from the reference picture and from the picture as search object. After completing the pre-processing, one performs the correlation processing. In another embodiment, one determines, from the correction table, a ratio between values of pixels different in position and then multiples the value of every pixel in the reference picture and the picture as search object by the determined ratio thereby reducing the positional difference.

If it is known, prior to processing, that the positional difference within the image plane has changed due to any change of conditions of the apparatus and of the sample 12 itself, one can reform the correction table during the time of sample exchange. Also, if the image plane corresponding to the sample 12 has such area where no pattern is present, then one can reform the correction table using the area.

Example of the Correction by Method (2)

As a pre-processing, one subjects both of the reference picture and the picture as search object to an edge extraction filtering processing so as to extract only the edge portion of the patterns. As the result, any gently changing portion such as the portion irregularly illuminated may be removed. The result obtainable by this processing is variable depending upon whether the processing is performed before the picture compression or after the picture compression.

For example, when the edge processing is carried out before picture compression, the processing requires relatively a long time. Furthermore, according to the compression ratio then selected, there may occur the case where all of the edge data are lost. Besides, one needs to optimize various parameters such as process sequence, compression ratio, kind of filter etc. taking into account the quality of the picture.

Example of the Correction by Method (3)

To decrease noises, one subjects both or either of the reference picture and the picture as search object to a filtering processing. Examples of useful filtering technique include filtering for smoothing, filtering for sharpening and filtering for the enhancement of edge portion. In carrying out this method, one need to optimize the filter taking into account the kind of the sample 12.

Example of the Correction by Method (4)

Immediately after the extraction of the reference pattern from the reference picture and the determination of the divided positions of picture compression for the picture as search object by check search have been completed, one moves the stage 11 in such manner that the pattern previously extracted as the reference pattern is moved to several points within the image plane. Thereafter one performs searches and divides the image plane into a plural number of blocks. The correlation value of the central block is evaluated as 1 and one divides the value by the correlation value of every block to obtain proportional coefficients which are used as the correction table. In the actual search, one multiples the correlation value of each block by the coefficient of the correction table to eliminate the positional difference in the same image plane. As a modification, one may obtain a correction table by computing the correction curved surface from the results of the searches by using the method of least squares.

These four correction methods may be used alone or in combination thereof.

As readily understood from the foregoing, the present invention has many advantages.

The possibility of detection error in pattern matching can be reduced to a great extent. This is because, as shown in the above embodiments, the divided positions of picture compression for the picture as search object are determined by the correlation values resulting from check searches. The check searches are conducted using the reference pattern previously extracted and on such reference pictures which have been picture-compressed variously changing the divided positions. Therefore, the possibility of detection error is markedly reduced.

In addition, by additionally conducting any processing selected from the above-mentioned processings (1) to (4) as pre-processing or after-processing according to the condition of the sample 12, it is possible to perform the pattern matching processing always in stable manner irrespective of the kind and quality of the sample 12.

In the above embodiments, the check search has been conducted on the reference picture from which the reference pattern have been extracted. From the correlation values obtained by it the search conditions for the picture as search object have been determined. On the basis of the determined search conditions, the actual search on the picture as search object has been performed.

However, it is to be understood that the object of the present invention can be attained also without such determination of search conditions. For example, the following embodiment is also possible:

The picture compression of the picture as search object is carried out several times while shifting the divided positions. Then, the actual searches are conducted on the respective pictures as search object as obtained by the picture compressions. In this embodiment, the reference pattern may be extracted from the compressed reference picture or the reference pattern may extracted from the reference picture before picture compression.

While the present invention has been particularly shown and described with reference to preferred embodiments thereof, it will be understood by those skilled in the art that the foregoing and other changes in form and details can be made therein without departing from the spirit and scope of the invention.

What is claimed is:

1. A pattern matching method for detecting a pattern analogous to a reference pattern in a picture as search object obtained by image-pickup of a test sample having patterns formed thereon, said method comprising the steps of:

inputting a reference picture by image-pickup of a reference sample having patterns formed thereon analogous to the test sample;

dividing said reference picture into elements having the same size and picture-compressing said reference picture by obtaining picture data representative of the individual elements based on the picture data of the individual pixels in the individual elements;

extracting a desired pattern as the reference pattern from said compressed reference picture;

inputting said picture as search object by image-pickup of the test sample;

dividing said picture as search object into elements having the same size as that of said reference picture and obtaining picture data representative of the individual elements based on the picture data of the individual pixels in the individual elements, thereby picture-compressing said picture as search object at the determined divided positions, and repeating such picture compression a plural number of times while shifting the divided positions of picture compression; and computing the correlation values of the individual elements relative to said reference pattern.

2. A pattern matching method as claimed in claim 1, which further comprises:

an offset picture inputting step for inputting a picture in which no pattern is present; and an adjustment step for conducting an offset adjustment on both of the reference picture and the picture as search object using said picture in which no pattern is present.

3. A pattern matching method as claimed in claim 1, which further comprises:

an edge enhancement step for conducting an edge-enhancing processing on both of the reference picture and the picture as search object.

4. A pattern matching method as claimed in claim 1, wherein said reference picture compression step and said picture as search object compression step comprises further:

a data conversion step for conducting data conversion on the picture data of the individual pixels in the individual elements employing the same statistical technique and wherein the picture data representative of said individual elements are obtained on the basis of the picture data after data conversion.

5. A pattern matching method as claimed in claim 1, which further comprises:

a display step for displaying the reference sample by image pickup of it;

a moving step for moving a desired pattern extracted as the reference pattern to several points on the image plane;

a correcting correlation value computing step for computing the correlation values between the individual reference pictures for correction obtained by the above moving step and the reference pattern;

a table making step for making, from the correlation values for correction thus computed, a correction table for the correlation values corresponding to their positions on the image plane; and a correction step for correcting the correlation values between the picture as search object and the reference picture based on said correlation table.

6. Apparatus for detecting a pattern analogous to a reference pattern in a picture as search object obtained by image-pickup of a test sample having patterns formed thereon, by pattern matching, said apparatus comprising:

picture inputting means for inputting a reference picture by image-pickup of a reference sample having patterns formed thereon analogous to the test sample and for inputting the picture as search object by image-pickup of the test sample;

reference picture compression means for dividing said reference picture into elements having a predetermined size and picture-compressing said reference picture by obtaining picture data representative of the individual elements based on the picture data of the individual pixels in the individual elements;

extraction means for extracting a desired pattern as the reference pattern from said compressed reference picture;

picture as search object compression means for dividing said picture as search object into elements having the same size as that of said reference picture and obtaining picture data representative of the individual elements based on the picture data of the individual pixels in the individual elements, thereby picture-compressing said picture as search object at the determined divided positions, and repeating such picture compression a plural number of times while shifting the divided positions of picture compression; and correlation value computing means for computing the correlation values of the individual compressed pictures as search object relative to said reference pattern.

7. A pattern matching method for detecting a pattern analogous to a reference pattern in a picture as search object obtained by image-pickup of a test sample having patterns formed thereon, said method comprising the steps of:

inputting a reference picture by image-pickup of a reference sample having patterns formed thereon analogous to the test sample;

extracting a desired pattern as the reference pattern from said reference picture;

dividing said reference pattern into elements having a determined size and picture-compressing said reference pattern by computing picture data representative of the individual elements based on the picture data of the individual pixels in the individual elements;

inputting said picture as search object by image-pickup of the test sample;

dividing said picture as search object into elements having the same size as that of said reference pattern and obtaining picture data representative of the individual elements based on the picture data of the individual pixels in the individual elements, thereby picture-compressing said picture as search object at the determined divided positions, and repeating such picture compression a plural number of times while shifting the divided positions of picture compression; and computing the correlation values of the individual compressed pictures as search object relative to said reference pattern.

8. A pattern matching method as claimed in claim 7, which further comprises:

an offset picture inputting step for inputting a picture in which no pattern is present; and an adjustment step for conducting an offset adjustment on both of the reference picture and the picture as search object using said picture in which no pattern is present.

9. A pattern matching method as claimed in claim 7, which further comprises:

an edge enhancement step for conducting an edge-enhancing processing on both of the reference picture and the picture as search object.

10. A pattern matching method as claimed in claim 7, wherein said reference pattern compression step and said picture as search object compression step comprises further:

a data conversion step for conducting data conversion on the picture data of the individual pixels in the individual elements employing the same statistical technique and wherein the picture data representative of said individual elements are obtained on the basis of the picture data after the data conversion.

11. A pattern matching method as claimed in claim 7, which further comprises:

a display step for displaying the reference sample by image pickup of it;

a moving step for moving a desired pattern extracted as the reference pattern to other several points on the image plane;

a correcting correlation value computing step for computing the correlation values between the individual reference pictures for correction obtained by the above moving step and the reference pattern;

a table making step for making, from the correlation values for correction thus obtained, a correction table for the correlation values corresponding to their positions on the image plane; and a correction step for correcting the correlation values between the compressed picture as search object and the compressed reference picture based on the correction table.

12. Apparatus for detecting a pattern analogous to a reference pattern in a picture as search object obtained by image-pickup of a test sample having patterns formed thereon, by pattern matching, said apparatus comprising:

picture inputting means for inputting a reference picture by image-pickup of a reference sample having patterns formed thereon analogous to the test sample and for inputting the picture as search object by image-pickup of the test sample;

extraction means for extracting a desired pattern as the reference pattern from the reference picture;

reference pattern compression means for dividing said reference pattern into elements having a predetermined size and picture-compressing said reference pattern by computing picture data representative of the individual elements based on the picture data of the individual pixels in the individual elements;

picture as search object compression means for dividing said picture as search object into elements having the same size as that of said reference pattern and computing picture data representative of the individual elements based on the picture data of the individual pixels in the individual elements, thereby picture-compressing said picture as search object, and repeating such picture compression a plural number of times while shifting the divided positions of picture compression; and correlation value computing means for computing the correlation values of the individual compressed pictures as search object relative to said reference pattern.

13. A pattern matching method for detecting a pattern analogous to a reference pattern in a picture as search object obtained by image-pickup of a test sample having patterns formed thereon, said method comprising:

a reference picture inputting step for inputting a reference picture by image-pickup of a reference sample having patterns formed thereon analogous to the test sample;

a reference picture compression step for dividing said reference picture into elements having a determined size and picture-compressing said reference picture by computing picture data representative of the individual elements based on the picture data of the individual pixels in the individual elements;

an extraction step for extracting a desired pattern as the reference pattern from said compressed reference picture;

a first correlation value computing means for repeating above-said image compression of the reference picture a plural number of times while shifting the divided positions and then computing the correlation values of the individual reference pictures obtained by said image compressions relative to said reference pattern;

an estimation step for estimating, from the correlation values thus obtained, the dependence of variation of the correlation values between said picture as search object and said reference pattern in two directions orthogonal to each other in a two-dimensional plane;

a determination step for determining, from the directional dependence of variation of the correlation values thus obtained, a plural number of sets of the divided positions of picture compression for said picture as search object;

a picture as search object inputting means for inputting said picture as search object by image-pickup of the test sample;

a picture as search object compression step for dividing said picture as search object into elements having the same size as that of said reference picture and computing picture data representative of the individual elements based on the picture data of the individual pixels in the individual elements, thereby picture-compressing said picture as search object at the determined divided positions, and repeating such picture compression a plural number of times for every set of the determined divided positions; and a second correlation value computing step for computing the correlation values of the individual compressed pictures as search object relative to said reference pattern.

14. A pattern matching method as claimed in claim 13, which further comprises:

a judgment step for making a judgment as to whether or not the size of the element and the divided positions at the reference picture compression step are suitable judging from the largeness of variation of the correlation values obtained at the first correlation value computing step.

15. A pattern matching method as claimed in claim 13, which further comprises:

an offset picture inputting step for inputting a picture in which no pattern in present; and an adjustment step for conducting an offset adjustment on both of the reference picture and the picture as search object using said picture in which no pattern is present.

16. A pattern matching method as claimed in claim 13, which further comprises:

an edge enhancement step for conducting an edge-enhancing processing on both of the reference picture and the picture as search object.

17. A pattern matching method as claimed in claim 13, wherein said reference picture compression step and said picture as search object compression step comprises further:

a data conversion step for conducting data conversion on the picture data of the individual pixels in the individual elements employing the same statistical technique and wherein;

the picture data representative of said individual elements are obtained on the basis of the picture data after data conversion.

18. A pattern matching method as claimed in claim 13, which further comprises:

a display step for displaying the reference sample by image pickup of it;

a moving step for moving the desired pattern extracted as the reference pattern to several points on the image plane;

a correcting correlation value computing step for computing the correlation values between the individual reference pictures for correction obtained by the above moving step and the reference pattern;

a table making step for making, from the correlation values for correction thus obtained, a correction table for the correlation values corresponding to their positions on the image plane; and a correction step for correcting the correlation values between the picture as search object and the reference picture based on the correction table.

19. Apparatus for detecting a pattern analogous to the reference pattern in the picture as search object obtained by image-pickup of a test sample having patterns formed thereon, by pattern matching, said apparatus comprising:

picture inputting means for inputting a reference picture by image-pickup of a reference sample having patterns formed thereon analogous to the test sample and for inputting the picture as search object by image-pickup of the test sample;

reference picture compression means for dividing said reference picture into elements having a predetermined size and picture-compressing said reference picture by obtaining picture data representative of the individual elements based on the picture data of the individual pixels in the individual elements;

extraction means for extracting a desired pattern as the reference pattern from said compressed reference picture;

first correlation value Computing means for repeating above-said image compression of the reference picture a plural number of times while shifting the divided positions and computing the correlation values of the individual reference pictures obtained by said plural times of image compression relative to said reference pattern;

estimation means for estimating, from the correlation values thus obtained, the dependence of variation of the correlation values between said picture as search object and said reference pattern in two directions orthogonal to each other in a two-dimensional plane;

determination means for determining, from the directional dependence of variation of the correlation values thus obtained, a plural number of sets of the divided positions of picture compression for said picture as search object;

picture as search object compression means for dividing said picture as search object into elements having the same size as that of said reference picture and obtaining picture data representative of the individual elements based on the picture data of the individual pixels in the individual elements, thereby picture-compressing said picture as search object at the determined divided positions, and repeating such picture compression a plural number of times for every set of the determined divided positions; and second correlation value computing means for computing the correlation values of the individual compressed as search object relative to said reference pattern.

* * * * *